(12) United States Patent
Pafumi et al.

(10) Patent No.: US 7,904,564 B2
(45) Date of Patent: Mar. 8, 2011

(54) METHOD AND APPARATUS FOR MIGRATING ACCESS TO BLOCK STORAGE

(75) Inventors: James A. Pafumi, Leander, TX (US); Dac D. Nguyen, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 11/751,344

(22) Filed: May 21, 2007

(65) Prior Publication Data

US 2008/0294773 A1 Nov. 27, 2008

(51) Int. Cl.
*G06F 15/16* (2006.01)
(52) U.S. Cl. .......................................... 709/227; 709/225
(58) Field of Classification Search .................. 709/227, 709/225
See application file for complete search history.

(56) References Cited

U.S. PATENT DOCUMENTS

| | | | | |
|---|---|---|---|---|
| 2002/0129085 | A1* | 9/2002 | Kubala et al. | 709/104 |
| 2002/0129172 | A1* | 9/2002 | Baskey et al. | 709/310 |
| 2003/0236852 | A1* | 12/2003 | Fernandes et al. | 709/215 |
| 2005/0268298 | A1* | 12/2005 | Hunt et al. | 718/1 |
| 2006/0143350 | A1* | 6/2006 | Miloushev et al. | 710/242 |
| 2006/0195663 | A1 | 8/2006 | Arndt et al. | |
| 2006/0195715 | A1* | 8/2006 | Herington | 714/4 |

OTHER PUBLICATIONS

Keahey et al., "Virtual playgrounds: managing virtual resources in the grid", Parallel and Distributed Processing Symposium, 2006. IPDPS 2006. 20th International Apr. 25-29, 2006 p. 8 pp.*
U.S. Appl. No. 11/351,020, filed Feb. 9, 2006, Boyd et al.

* cited by examiner

*Primary Examiner* — Vivek Srivastava
*Assistant Examiner* — William J Goodchild
(74) *Attorney, Agent, or Firm* — Matthew W. Baca; Amy J. Pattillo

(57) ABSTRACT

A computer implemented method, apparatus, and computer usable program code for providing access to block storage. A source virtual input/output server is retrieved, parameters are used by the source virtual input/output server to provide a client access to the block storage when the client is located on a first logical partitioned data processing system with the source virtual input/output server, wherein the client accesses the block storage through the source virtual input/output server. Access for the client to the block storage is migrated to a target virtual input/output server located on a second logical partitioned data processing system using the parameters, wherein the parameters are used on the target virtual input/output server to provide the client access to the block storage when the client is migrated to the second data processing system.

5 Claims, 7 Drawing Sheets

```xml
<v-scsi-host>
    <attribute>
        <name> version </name>
        <value> 1 </value>
    </attribute>
    <attribute>
        <name> maxTransfer </name>
        <value> 262144 </value>
    </attribute>
    <attribute>
        <name> minVIOSpatch </name>
        <value> 0 </value>
    </attribute>
    <attribute>
        <name> minVIOScompatability </name>
        <value> 1 </value>
    </attribute>
    <attribute>
        <name> effectiveVIOScompatability </name>
        <value> -1 </value>
    </attribute>
    <ras>
        <attribute>
            <name> partitionID </name>
            <value> 2 </value>
        <attribute>
    <ras>
    <virtualDevice>
        <virtualLUN>
            <attribute>
                <name> LogicalUnitAddr </name>
                <value> 0x8100000000000000 </value>
            </attribute>
            <attribute>
                <name> LogicalUnitState </name>
                <value> 0 </value>
            </attribute>
            <attribute>
                <name> clientReserve </name>
                <value> no </value>
            </attribute>
            <AIX>
                <attribute>
                    <name> type </name>
                    <value> vdasd </value>
                </attribute>
                <attribute>
                    <name> connWhere </name>
                    <value> 1 </value>
                </attribute>
            </AIX>
        <virtualLUN>
        <blockStorage>
            <attribute>
                <name> reserveType </name>
                <value> SCSI_2 </value>
            </attribute>
```

602 brackets: attributes from version through effectiveVIOScompatability
604 brackets: virtualDevice section

METHOD AND APPARATUS FOR MIGRATING ACCESS TO BLOCK STORAGE

BACKGROUND OF THE INVENTION

1. Field of the Invention

The present invention relates generally to an improved data processing system and in particular to a method and apparatus for processing data. Still more particularly, the present invention related to a computer implemented method, apparatus, and computer usable program code for accessing block storage.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

With these types of logical partitioned systems, a client application running on one partition may access virtual storage devices through a specially designated partition called a virtual input/output server partition. This partition is located on the same computer or device as the partition in which the client executes. This virtual storage is also referred to as block storage. A client accesses this block storage through a pair of virtual adapters. One virtual adapter is associated with the client and is referred to as the client adapter. The other virtual adapter is associated with the virtual input/output server and referred to as the server adapter. The client process makes requests through the client adapter and the virtual input/output server provides access to the data in the block storage through the server adapter.

With these types of systems, a need may arise to move the client from a partition in one data processing system to a partition in another data processing system. This need may be, for example, a need to perform maintenance on hardware on the data processing system on which the client is currently executing. The client also may be moved to perform an upgrade in which the second data processing system has upgraded components and performance as compared to the data processing system in which the client is currently executing.

It is often desirable to terminate execution of the client on the source data processing system and then reinitiate execution of the client on the target data processing system. The client can be moved to the target data processing system, and the client's execution can start on that system without interruption to applications running on the client. The client may also be move while it is not running. Data for the state of the client on the source data processing system can also be saved while the client is running; that is the client is suspended and restored to its former operating state on the same processing system or a target processing system at a later time.

SUMMARY OF THE INVENTION

The illustrative embodiments provide a computer implemented method, apparatus, and computer usable program code for providing access to block storage. A source virtual input/output server is retrieved, parameters are used by the source virtual input/output server to provide a client access to the block storage when the client is located on a first logical partitioned data processing system with the source virtual input/output server, wherein the client accesses the block storage through the source virtual input/output server. Access for the client to the block storage is migrated to a target virtual input/output server located on a second logical partitioned data processing system using the parameters, wherein the parameters are used on the target virtual input/output server to provide the client access to the block storage when the client is migrated to the second data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
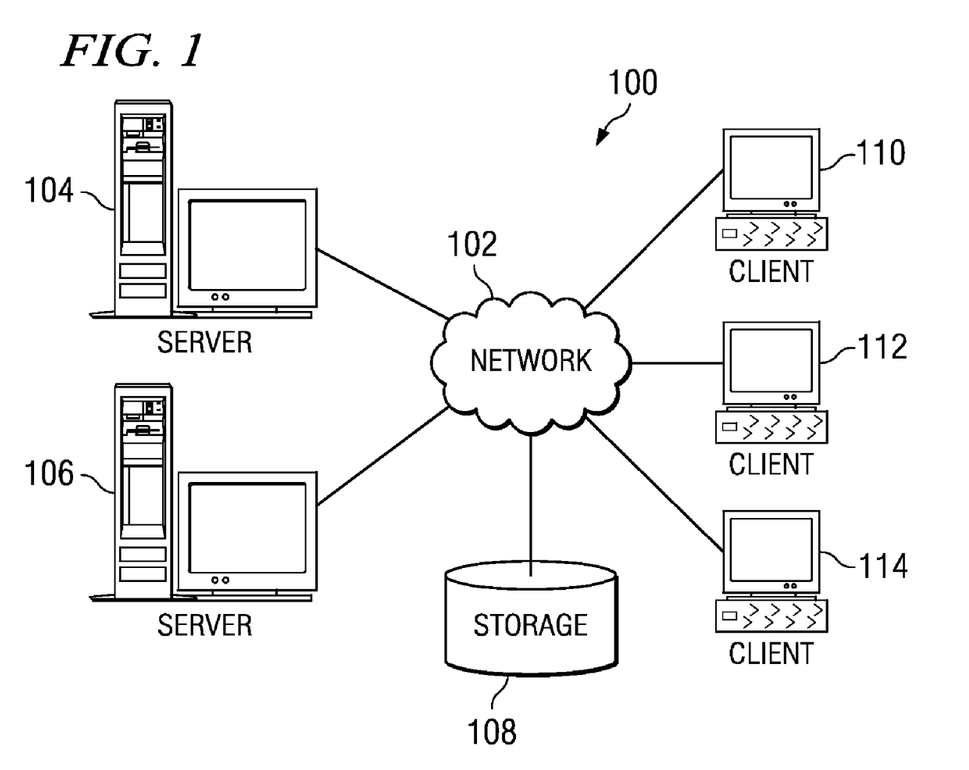
FIG. 1 is a pictorial representation of a network of data processing systems in which illustrative embodiments may be implemented.
Figure 2:
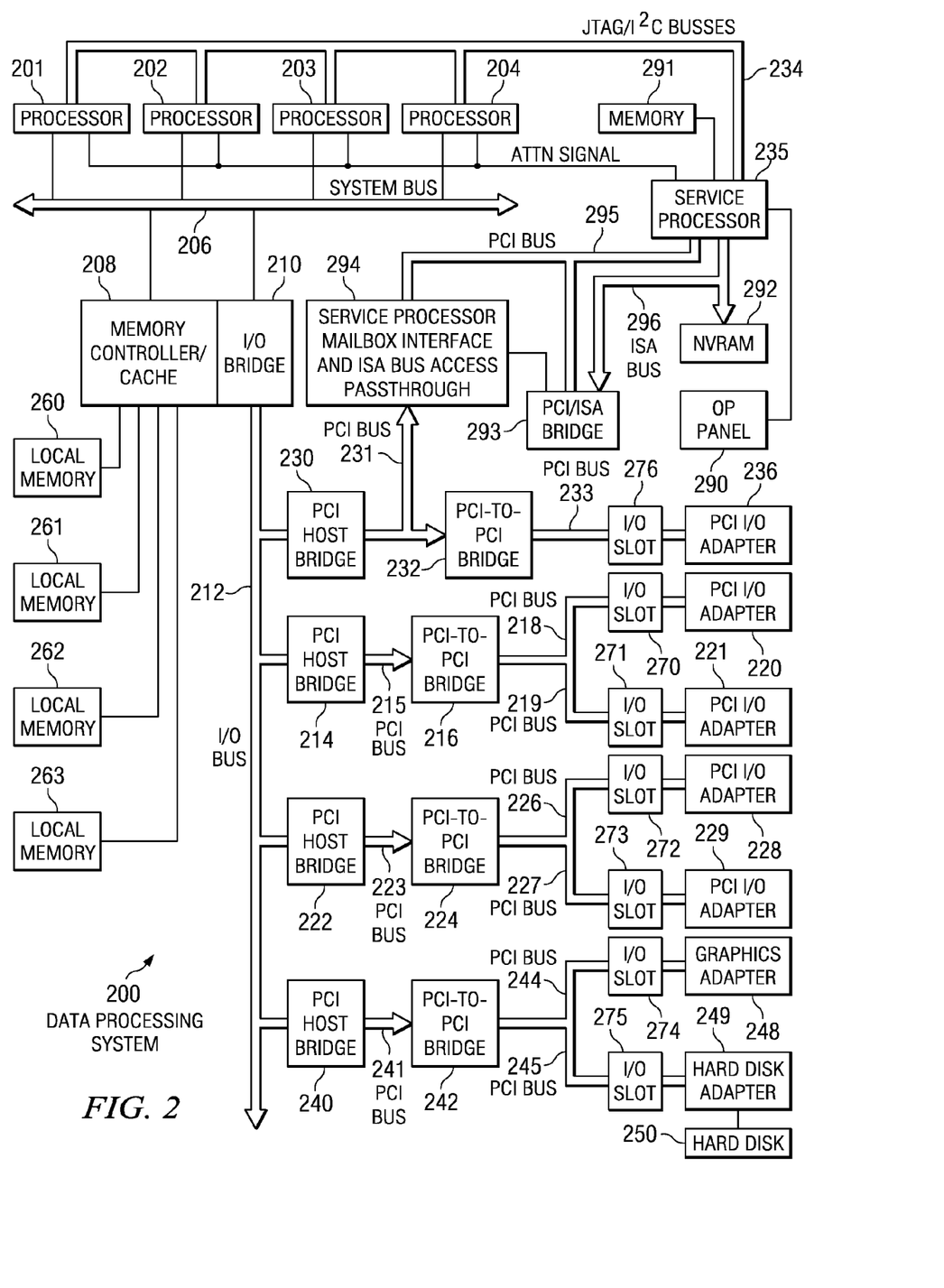
FIG. 2 is a block diagram of a data processing system in which illustrative embodiments may be implemented.
Figure 3:
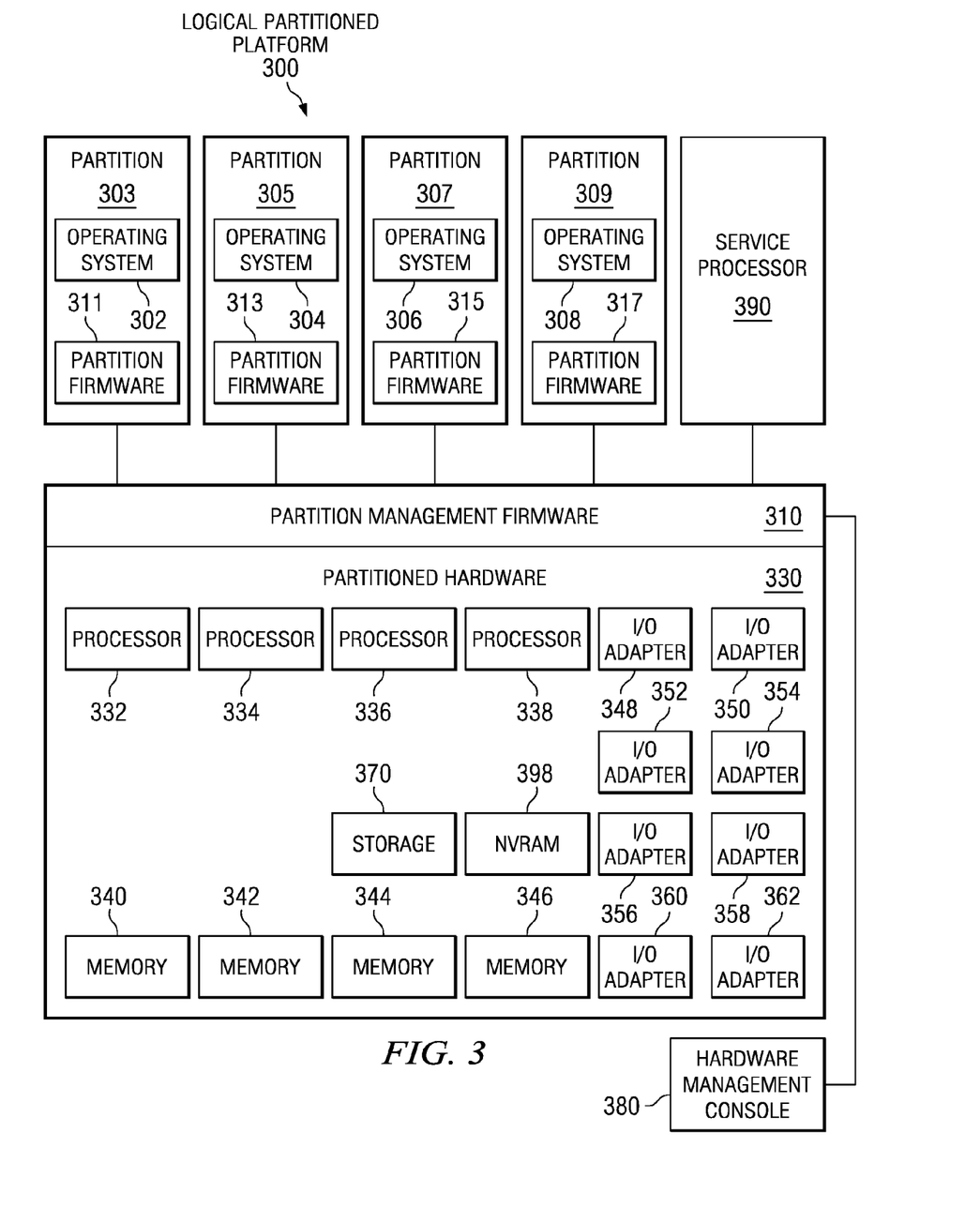
FIG. 3 is a block diagram of an exemplary logical partitioned platform in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of a data processing system in which illustrative embodiments may be implemented is depicted. Data processing system 200 may be a symmetric multiprocessor (SMP) system including processors 201, 202, 203, and 204, which connect to system bus 206. For example, data processing system 200 may be an IBM eServer, a product of International Business Machines Corporation in Armonk, N.Y., implemented as a server within a network. Alternatively, a single processor system may be employed. Also connected to system bus 206 is memory controller/cache 208, which provides an interface to local memories 260, 261, 262, and 263. I/O bridge 210 connects to system bus 206 and provides an interface to I/O bus 212. Memory controller/cache 208 and I/O bridge 210 may be integrated as depicted.

Data processing system 200 is a logical partitioned (LPAR) data processing system. Thus, data processing system 200 may have multiple heterogeneous operating systems (or multiple instances of a single operating system) running simultaneously. Each of these multiple operating systems may have any number of software programs executing within it. Data processing system 200 is logically partitioned such that different PCI I/O adapters 220, 221, 228, 229, and 236, graphics adapter 248, and hard disk adapter 249 may be assigned to different logical partitions. In this case, graphics adapter 248 connects to a display device (not shown), while hard disk adapter 249 connects to and controls hard disk 250.

Thus, for example, suppose data processing system 200 is divided into three logical partitions, P1, P2, and P3. Each of PCI I/O adapters 220, 221, 228, 229, and 236, graphics adapter 248, hard disk adapter 249, each of host processors 201, 202, 203, and 204, and memory from local memories 260, 261, 262, and 263 is assigned to each of the three partitions. In these examples, memories 260, 261, 262, and 263 may take the form of dual in-line memory modules (DIMMs). DIMMs are not normally assigned on a per DIMM basis to partitions. Instead, a partition will get a portion of the overall memory seen by the platform. For example, processor 201, some portion of memory from local memories 260, 261, 262, and 263, and I/O adapters 220, 228, and 229 may be assigned to logical partition P1; processors 202 and 203, some portion of memory from local memories 260, 261, 262, and 263, and PCI I/O adapters 221 and 236 may be assigned to partition P2; and processor 204, some portion of memory from local memories 260, 261, 262, and 263, graphics adapter 248 and hard disk adapter 249 may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX®) operating system may be executing within partition P1, a second instance (image) of the AIX® operating system may be executing within partition P2, and a Linux or OS/400 operating system may be operating within logical partition P3.

Peripheral component interconnect (PCI) host bridge 214 connected to I/O bus 212 provides an interface to PCI local bus 215. PCI I/O adapters 220 and 221 connect to PCI bus 215 through PCI-to-PCI bridge 216, PCI bus 218, PCI bus 219, I/O slot 270, and I/O slot 271. PCI-to-PCI bridge 216 provides an interface to PCI bus 218 and PCI bus 219. PCI I/O adapters 220 and 221 are placed into I/O slots 270 and 271, respectively. Typical PCI bus implementations support between four and eight I/O adapters (i.e. expansion slots for add-in connectors). Each PCI I/O adapter 220-221 provides an interface between data processing system 200 and input/output devices such as, for example, other network computers, which are clients to data processing system 200.

An additional PCI host bridge 222 provides an interface for an additional PCI bus 223. PCI bus 223 connects to a plurality of PCI I/O adapters 228 and 229. PCI I/O adapters 228 and 229 connect to PCI bus 223 through PCI-to-PCI bridge 224, PCI bus 226, PCI bus 227, I/O slot 272, and I/O slot 273. PCI-to-PCI bridge 224 provides an interface to PCI bus 226 and PCI bus 227. PCI I/O adapters 228 and 229 are placed into I/O slots 272 and 273, respectively. In this manner, additional I/O devices, such as, for example, modems or network adapters may be supported through each of PCI I/O adapters 228-229. Consequently, data processing system 200 allows connections to multiple network computers.

A memory mapped graphics adapter 248 is inserted into I/O slot 274 and connects to I/O bus 212 through PCI bus 244, PCI-to-PCI bridge 242, PCI bus 241, and PCI host bridge 240. Hard disk adapter 249 may be placed into I/O slot 275, which connects to PCI bus 245. In turn, this bus connects to PCI-to-PCI bridge 242, which connects to PCI host bridge 240 by PCI bus 241.

A PCI host bridge 230 provides an interface for PCI bus 231 to connect to I/O bus 212. PCI I/O adapter 236 connects to I/O slot 276, which connects to PCI-to-PCI bridge 232 by PCI bus 233. PCI-to-PCI bridge 232 connects to PCI bus 231. This PCI bus also connects PCI host bridge 230 to the service processor mailbox interface and ISA bus access pass-through 294 and PCI-to-PCI bridge 232. Service processor mailbox interface and ISA bus access pass-through 294 forwards PCI accesses destined to the PCI/ISA bridge 293. NVRAM storage 292 connects to the ISA bus 296. Service processor 235 connects to service processor mailbox interface and ISA bus access pass-through logic 294 through its local PCI bus 295. Service processor 235 also connects to processors 201, 202, 203, and 204 via a plurality of JTAG/I²C busses 234. JTAG/I²C busses 234 are a combination of JTAG/scan busses (see IEEE 1149.1) and Phillips I²C busses. However, alternatively, JTAG/I²C busses 234 may be replaced by only Phillips I²C busses or only JTAG/scan busses. All SP-ATTN signals of the host processors 201, 202, 203, and 204 connect together to an interrupt input signal of service processor 235. Service processor 235 has its own local memory 291 and has access to the hardware OP-panel 290.

When data processing system 200 is initially powered up, service processor 235 uses the JTAG/I²C busses 234 to interrogate the system (host) processors 201, 202, 203, and 204, memory controller/cache 208, and I/O bridge 210. At the completion of this step, service processor 235 has an inventory and topology understanding of data processing system 200. Service processor 235 also executes Built-In-Self-Tests (BISTs), Basic Assurance Tests (BATs), and memory tests on all elements found by interrogating the host processors 201, 202, 203, and 204, memory controller/cache 208, and I/O bridge 210. Any error information for failures detected during the BISTs, BATs, and memory tests are gathered and reported by service processor 235.

If a meaningful and valid configuration of system resources is still possible after taking out the elements found to be faulty during the BISTs, BATs, and memory tests, then data processing system 200 is allowed to proceed to load executable code into local (host) memories 260, 261, 262, and 263. Service processor 235 then releases host processors 201, 202, 203, and 204 for execution of the code loaded into local memory 260, 261, 262, and 263. While host processors 201, 202, 203, and 204 are executing code from respective operating systems within data processing system 200, service processor 235 enters a mode of monitoring and reporting errors. The type of items monitored by service processor 235 include, for example, the cooling fan speed and operation, thermal sensors, power supply regulators, and recoverable and non-recoverable errors reported by processors 201, 202, 203, and 204, local memories 260, 261, 262, and 263, and I/O bridge 210.

Service processor 235 saves and reports error information related to all the monitored items in data processing system 200. Service processor 235 also takes action based on the type of errors and defined thresholds. For example, service processor 235 may take note of excessive recoverable errors on a processor's cache memory and decide that this is predictive of a hard failure. Based on this determination, service processor 235 may mark that resource for de-configuration during the current running session and future Initial Program Loads (IPLs). IPLs are also sometimes referred to as a "boot" or "bootstrap".

Data processing system 200 may be implemented using various commercially available computer systems. For example, data processing system 200 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to illustrative embodiments.

With reference now to FIG. 3, a block diagram of an exemplary logical partitioned platform is depicted in which illustrative embodiments may be implemented. The hardware in logical partitioned platform 300 may be implemented as, for example, data processing system 200 in FIG. 2. Logical partitioned platform 300 includes partitioned hardware 330, operating systems 302, 304, 306, 308, and partition management firmware 310. Operating systems 302, 304, 306, and 308 may be multiple copies of a single operating system or multiple heterogeneous operating systems simultaneously run on logical partitioned platform 300. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX® and Linux, may be used depending on the particular implementation. Operating systems 302, 304, 306, and 308 are located in partitions 303, 305, 307, and 309. Hypervisor software is an example of software that may be used to implement partition management firmware 310 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 311, 313, 315, and 317. Partition firmware 311, 313, 315, and 317 may be implemented using initial boot strap code, IEEE-1275 Standard Open Firmware, and runtime abstraction software (RTAS), which is available from International Business Machines Corporation. When partitions 303, 305, 307, and 309 are instantiated, a copy of boot strap code is loaded onto partitions 303, 305, 307, and 309 by platform firmware 310. Thereafter, control is transferred to the boot strap code with the boot strap code then loading the open firmware and RTAS. The processors associated or assigned to the partitions are then dispatched to the partition's memory to execute the partition firmware.

Partitioned hardware 330 includes processors 332, 334, 336, and 338, memories 340, 342, 344, and 346, input/output (I/O) adapters 348, 350, 352, 354, 356, 358, 360, and 362, and a storage unit 370. Each of processors 332, 334, 336, and 338, memories 340, 342, 344, and 346, NVRAM storage 398, and I/O adapters 348, 350, 352, 354, 356, 358, 360, and 362 may be assigned to one of multiple partitions within logical partitioned platform 300, each of which corresponds to one of operating systems 302, 304, 306, and 308.

Partition management firmware 310 performs a number of functions and services for partitions 303, 305, 307, and 309 to create and enforce the partitioning of logical partitioned platform 300. Partition management firmware 310 is a firmware implemented virtual machine identical to the underlying hardware. Thus, partition management firmware 310 allows the simultaneous execution of independent OS images 302, 304, 306, and 308 by virtualizing all the hardware resources of logical partitioned platform 300.

Service processor 390 may be used to provide various services, such as processing of platform errors in the partitions. These services also may act as a service agent to report errors back to a vendor, such as International Business Machines Corporation. Operations of the different partitions may be controlled through a hardware management console, such as hardware management console 380. Hardware management console 380 is a separate data processing system from which a system administrator may perform various functions including reallocation of resources to different partitions.

The different illustrative embodiments recognize that as part of the migration process it may not be possible to restore a client to the client's prior state if the client is unable to access files or other information located in block storage once the client has been migrated.

The different illustrative embodiments recognize that the currently available solutions do not take this into account. Currently, solutions that require block storage through a virtual input/output server cannot be migrated in a manner in which the execution of the client is not terminated.

The different illustrative embodiments provide a computer implemented method, apparatus, and computer usable program code for providing access to block storage. Parameters are retrieved from a source virtual input/output server used by the source input/output server to provide a client access to the block storage. The client is located on the first logical partitioned data processing system with the source virtual input/output server. The client accesses the block storage through the source virtual input/output server. Access for the client to the block storage is migrated to a target virtual input/output server located on a second logical partitioned data processing system using the parameters. The parameters are used on the target virtual input/output server to provide the client access to the block storage when the client is migrated to the second data processing system.

The different embodiments may be used in migrating a client from a source data processing system to a target data processing system without interruption to the execution of the client. These embodiments also may be applied to a process in which the data for the state of the client is saved, the client is suspended, and the client is restored to its former operating state on a target data processing system. The illustrative embodiments also may be applied to restoring the client on the same data processing system. Another example of when the different embodiments may be used is when a client is moved to another data processing system while the client is not running. These examples are merely illustrative of some of the situations in which the illustrative embodiments may be used. It may also be the case that a client that is not running can be migrated to another data processing system.

Figure 4:
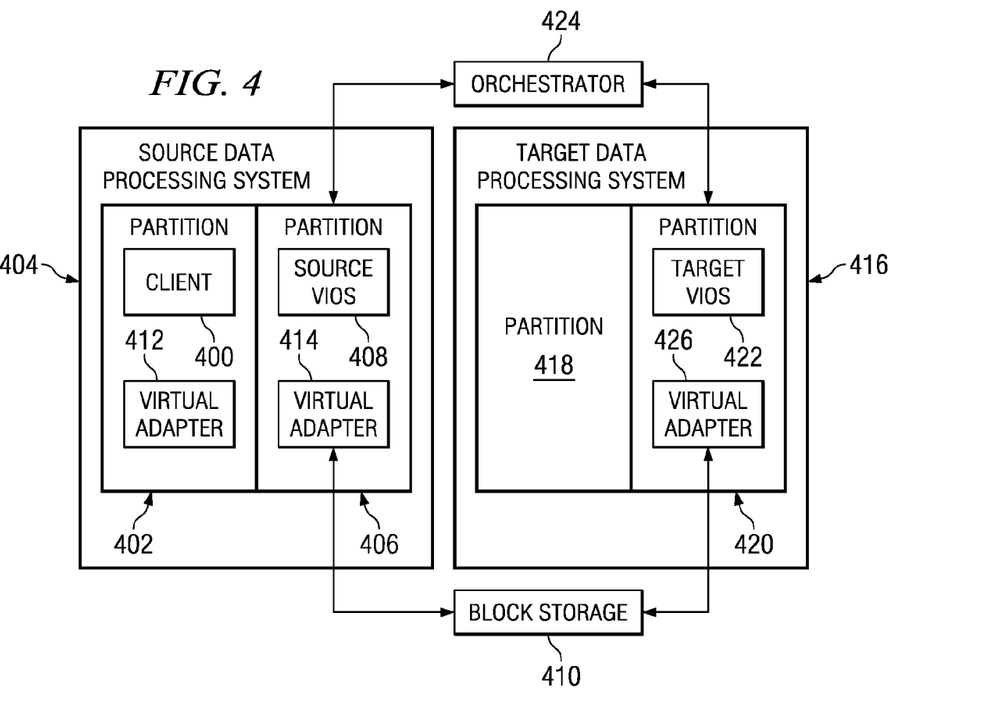
FIG. 4 is a diagram of components used to provide access to block storage in accordance with an illustrative embodiment.

Turning now to FIG. 4, a diagram of components used to provide access to block storage is depicted in accordance with an illustrative embodiment. In this example, client 400 is a client process or program currently executed on partition 402 on source data processing system 404. Client 400 may be, for example, a web server process or a database program. Source data processing system 404 also includes partition 406 on which source virtual input/output server (VIOS) 408 executes. Source data processing system 404 is an example of a data processing system, such as logical partition platform 200 in FIG. 2.

Client 400 accesses block storage 410 through source virtual input/output server 408. More specifically, client 400 is assigned or associates with virtual adapter 412. Virtual adapter 414 is associated with source virtual input/out server 408. Client 400 may make requests for data in block storage 410 using virtual adapter 412. In turn, virtual adapter 412 sends request to virtual adapter 414. Virtual adapter 414 accesses block storage 410 and turns results to client 400. In these examples, client 400 is located on the same data processing system as the virtual input/output server that is used to provide access to block storage 410.

Block storage 410 is a logical representation of storage devices that may be accessed by client 400. These storage devices may be, for example, a set of hard disk drives. Client 400 may see one logical hard disk drive that is actually constructed from five hard disk drives.

In these examples, client 400 is to be moved or migrated to target data processing system 416. Target data processing system 416 may be implemented using a logical partition platform, such as logical partition platform 200 in FIG. 2. In this example, partitions 418, and 420 are depicted as being present on target data processing system 416. Partition 420 contains target virtual input/output server (VIOS) 422.

Client 400 is scheduled to be moved to partition 418 on target data processing system 416 from partition 402 on source data processing system 404. In the illustrative embodiments, orchestrator 424 is a software component that implements processes used to allow client 400 to access block storage 410 from partition 418 after client 400 has been migrated from source data processing system 404 to target data processing system 416. Orchestrator 424 may executed on a device, such as hardware management console 380 in FIG. 3.

In the different embodiments, this type of migration of access to block storage 410 includes processes in source virtual input/output server 408 that generates data that describe what is needed to access block storage 410. In these examples, orchestrator 424 may be located on a hardware management console, such as hardware management console 280 in FIG. 2. Further, orchestrator 424 also may include other processes used to migrate client 400 from partition 402 in source data processing system 404 to partition 418 on target data processing system 416.

When client 400 is migrated to partition 418, client 400 is presented with access to block storage 410 in the same manner as when client 400 was located on partition 402 on source data processing system 404.

In providing access to block storage 410 on target data processing system 416, orchestrator 424 sends a command to source virtual input/output server 408 to request parameters describing the information needed to recreate the access to block storage 410 on target virtual input/output server 422. The information provided by source virtual input/output server 408 is used by orchestrator 424 to recreate the connection to block storage 410 in target virtual input/output server 422 for client 400. In these examples, the parameters include information needed to recreate and configure virtual adapter 426 to provide access to client 400.

Figure 5:
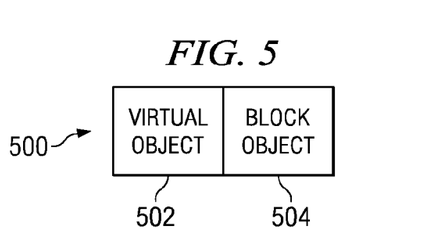
FIG. 5 is a diagram illustrating a data structure containing parameters generated by a virtual input/output server in accordance with an illustrative embodiment.

Turning now to FIG. 5, a diagram illustrating a data structure containing parameters generated by a virtual input/output server is depicted in accordance with an illustrative embodiment. Data structure 500 may be a file or a data stream in these examples. In the depicted example, data structure 500 is an extensible markup language (XML) data structure.

In this example, data structure 500 contains virtual object 502 and block object 504. These objects contain the information needed to provide a client access to block storage at a target partition. Virtual object 502 describes the different attributes of the virtual adapter in virtual object 502. Block object 504 describes the virtual devices accessed by the clients in the block storage. Data structure 500 allows for device operating systems to cooperate in a migration. The description may be specific to one operating system acting as the virtual input/output server. Alternatively, the description in data structure 500 may be more generic such that different operating systems may use the information to recreate connections to the block storage.

Figure 6:
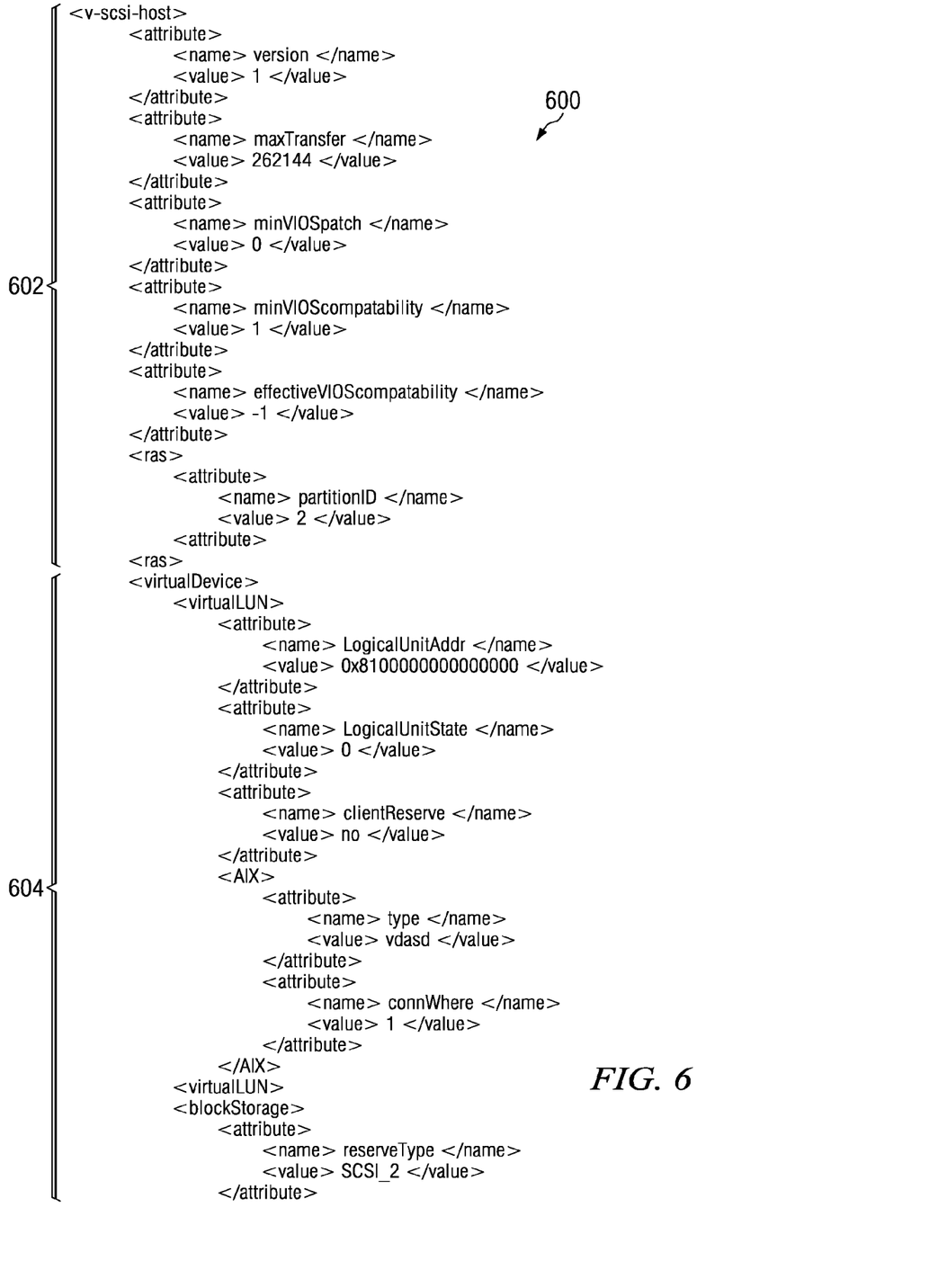
FIG. 6 is a diagram illustrating example parameters for describing block storage in accordance with an illustrative embodiment.

Turning now to FIG. 6, a diagram illustrating example parameters for describing block storage is depicted in accordance with an illustrative embodiment. In this example, data structure 600 is an example of data structure 500 in FIG. 5. In particular, data structure 600 is an example of an extensible markup language file containing a virtual object and a block object. Section 602 contains parameters for the virtual object, while section 604 contains parameters for the block object. In these examples, data structure 600 is an example of one for an AIX® based virtual input/output server. The particular parameters used may vary depending on the implementation. The actual parameters and information returned by the virtual input/output server contains information needed to recreate access on another virtual input/output server in these examples.

Figure 7:
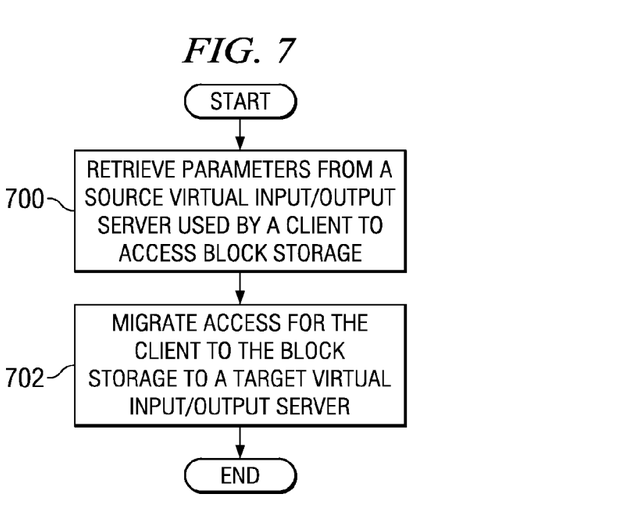
FIG. 7 is a flowchart of a process for providing access to block storage in accordance with an illustrative embodiment.

Turning now to FIG. 7, a flowchart of a process for providing access to block storage is depicted in accordance with an illustrative embodiment. The process illustrated in FIG. 7 may be implemented in a software component, such as orchestrator 424 in FIG. 4.

The process begins by retrieving parameters from a source virtual input/output server used by a client to access block storage (step 700). Then, the process migrates access for the client to the block storage to a target virtual input/output server (step 702) with the process terminating thereafter.

Figure 8:
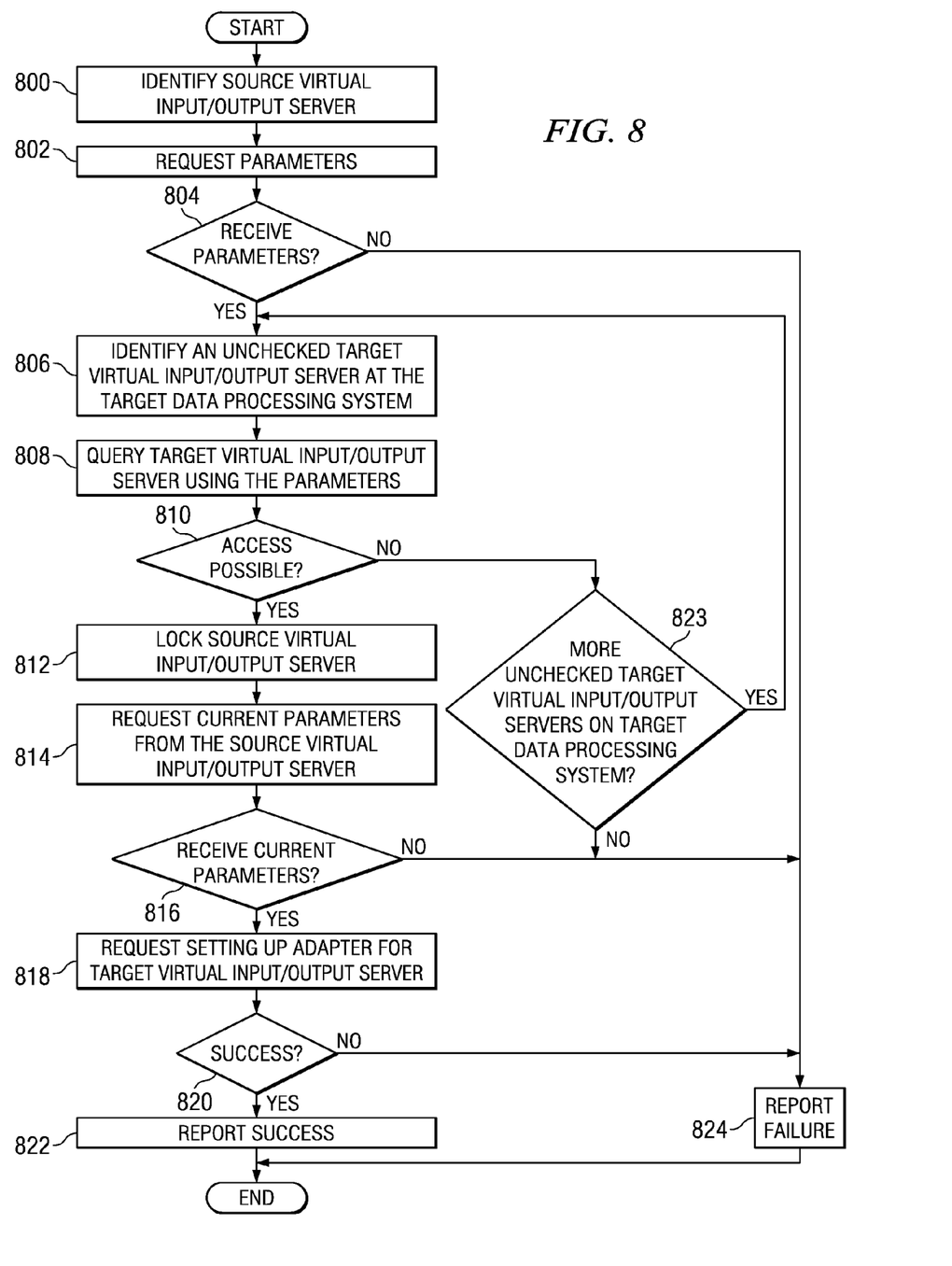
FIG. 8 is a flowchart of a process for moving or migrating access to a block storage for a client process in accordance with an illustrative embodiment.

Turning now to FIG. 8, a flowchart of a process for moving or migrating access to a block storage for a client process is depicted in accordance with an illustrative embodiment. The process illustrated in FIG. 8 is a more detailed description of processes that may be implemented in a software component, such as orchestrator 424 in FIG. 4.

The process beings by identifying a source virtual input/output server (step 800). Thereafter, the process request parameters from the identified source virtual input/output server (step 802). In these examples, the request is made in the form of a command. A determination is made as to whether the parameters are received in response to the request (step 804). If parameters are received, then an unchecked target virtual input/output server is identified on the target data processing system (step 806).

The target virtual input/output server identified in step 806 is queried using the parameters (step 808). The process then determines whether access is possible based on the query at the target virtual input/output server (step 810). If access is possible, the source virtual input/output server is locked (step 812). The source virtual input/output server is locked such that changes do not occur that might prevent access by the client to the block storage.

After the source virtual input/output server is locked, the process requests current parameters from the source virtual input/output server (step 814). A determination is made as to whether current parameters are returned by the source virtual input/output server (step 816). If parameters are returned, the process requests setting up an adapter for the target virtual input/output server (step 818). This request includes the current parameters retrieved from the source virtual input/output server. These parameters are sent in the form of an XML file or stream in these examples.

A determination is the made as to whether the setting up of the adapter on the target virtual input/output server was successful (step 820). If the adapter was successfully created, then a report of success is generated (step 822) with the process terminating thereafter. This report may be presented to a user managing the migration of the client. Alternatively, or in addition, this information may be used by another process to indicate that the migration of the client may continue.

With reference again to step 816, if current parameters are not received from the source virtual input/output server, a failure is reported (step 824) with the process then terminating thereafter. With this type of failure the migration of the client is aborted. The migration is aborted because even if the client in its state information could be successfully recreated on the target data processing system, the client process cannot access the block storage. As a result, the client is unable to resume its execution without being restarted or reconfigured.

With reference again to step 810, if the target virtual input/output server reports that access is not possible, a determination is made as to whether an additional unchecked target virtual input/output server is present on the target data processing system (step 823). If another unchecked target virtual input/output server is present on the target data processing system, the process returns to step 806. Otherwise, the process proceeds to step 824. In step 804, if parameters describing the source virtual input/output server are not received, the process proceeds to step 824 as described above. If setting up the adapter on the target virtual input/output server in step 820 is not successful, the process proceeds to step 824.

Figures 9, 10, 11:
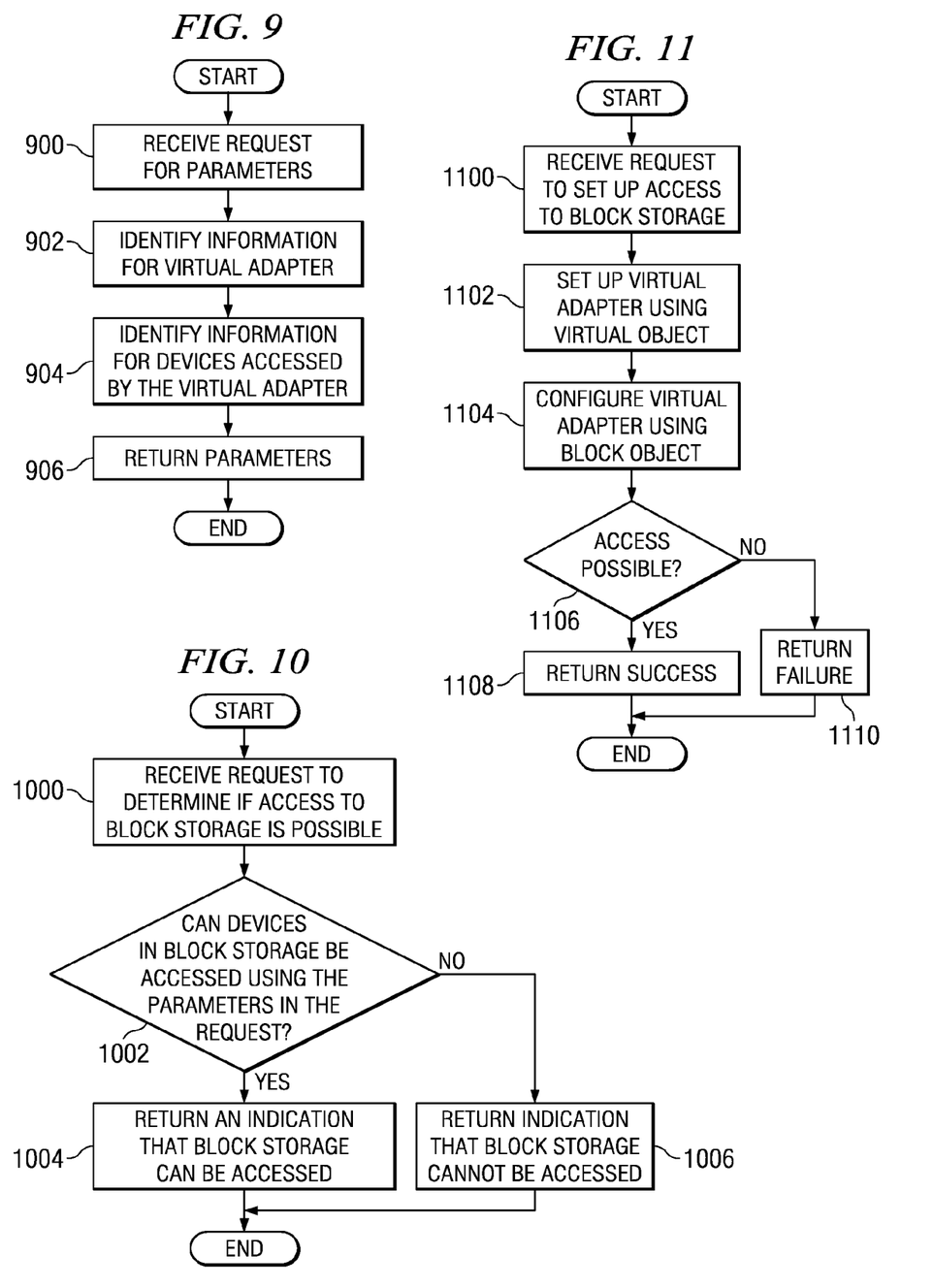
FIG. 9 is a flowchart of a process for generating parameters describing access to block storage in accordance with an illustrative embodiment.
FIG. 10 is a flowchart of a process for determining whether access to block storage can be provided on a target virtual input/output server in accordance with an illustrative embodiment.
FIG. 11 is a flowchart of a process for setting up access to block storage in accordance with an illustrative embodiment.

Turning now to FIG. 9, a flowchart of a process for generating parameters describing access to block storage is depicted in accordance with an illustrative embodiment. The process illustrated in FIG. 9 may be implemented in a software component, such as source virtual input/output server 408 in FIG. 4.

The process begins by receiving a request for parameters (step 900). In response to receiving this request, information for the virtual adapter is identified (step 902). The information identified in step 902 forms a virtual object.

The process then identifies information for devices accessed by the virtual adapter (step 904). These devices are the ones that form the block storage accessed by the client process. This information forms a block object. Thereafter, the parameters are returned to the requester (step 906) with the process terminating thereafter.

Turning now to FIG. 10, a flowchart of a process for determining whether access to block storage can be provided on a target virtual input/output server is depicted in accordance with an illustrative embodiment. The process illustrated in FIG. 10 may be implemented on a software component, such as target virtual input/output server 422 in FIG. 4.

The process begins by receiving a request to determine whether access to block storage is possible (step 1000). In these examples, the request includes the parameters generated by the source virtual input/output server. These parameters are received in a data structure, such as data structure 500 in FIG. 5.

A determination is made as to whether the devices in the block storage can be accessed using the parameters received and the request (step 1002). If the devices in the block storage can be accessed, then an indication that the block storage can be accessed is returned to the requester (step 1004) with the process terminating thereafter.

With reference again to step 1002, if the devices in the block storage cannot be accessed using the parameters in the request, an indication is returned that the block storage cannot be accessed (step 1006) with the process terminating thereafter.

Turning now to FIG. 11, a flowchart of a process for setting up access to block storage is depicted in accordance with an illustrative embodiment. The process illustrated in FIG. 11 may be implemented in a software component, such as target virtual input/output server 422 in FIG. 4.

The process begins by receiving a request to set up access to block storage (step 1100). In this example, the request includes a data structure, such as data structure 500 in FIG. 5. The parameters in this request are current parameters that are obtained after the virtual input/output server is locked in a manner that the parameters needed to access the block storage by the client do not change. In this manner, when the client is migrated to the target server, the client will not receive any changes. The process sets up a virtual adapter for the target virtual input/output server using the virtual object (step 1102).

Thereafter, the virtual adapter is configured using the block object (step 1104). After the configuration has occurred, a determination is made as to whether access to the block storage is possible with the current parameters (step 1106). If access is possible, the process returns an indication of success (step 1108) with the process terminating thereafter. Otherwise, the process returns an indication of failure (step 1110) with the process also terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer usable program code for providing access to block storage. In the different embodiments, parameters used by a source virtual input/output server to provide a client access to block storage when the client is located in a first logical data processing system with the source virtual input/output server are retrieved. The client accesses the block storage through the virtual source input/output server. Access for the client to the block storage is migrated to a target virtual input/output server located on a second logical partitioned data processing system using the parameters. These parameters are used on the target virtual input/output server to provide the client access to the block storage when the client is migrated to the second logical partitioned data processing system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing access to block storage, the computer implemented method comprising:

monitoring, by an orchestrator executing on a hardware management console, a migration setting for a client executing on a first partition of a plurality of partitions of a first logical partitioned data processing system, wherein the client is at least one of a process and a program, wherein the hardware management console executes on a separate data processing system from the first logical partitioned data processing system, wherein a source virtual input/output server executes on a second partition of the first logical partition data processing system, wherein the source virtual input/output server provides access to the client to a block storage through a server adapter within the second partition, wherein the client accesses the block storage by sending access requests from a client adapter in the first partition to the server adapter in the second partition, wherein the server adapter accesses the block storage and returns results to the client adapter;

responsive to the orchestrator detecting the client is scheduled for migration to a fourth partition of a second logical partitioned data processing system separate from the first logical partitioned data processing system, identifying the source virtual input/output server in the first logical partitioned data processing system for the client and requesting parameters used by the source virtual input/output server to provide the client access to the block storage, wherein the parameters comprise a virtual object that describes said server adapter and a block object that describes said block storage;

responsive to the orchestrator receiving the parameters from the source virtual input/output server, identifying an unchecked target virtual input/output server executing in a third partition on the second logical partitioned data processing system;

querying, by the orchestrator, the target virtual input/output server with the parameters to determine whether access to the block storage is available through the target virtual input/output server;

responsive to the orchestrator receiving an indicator from the target virtual input/output server that access is available, locking, by the orchestrator, the source virtual input/output server;

requesting, by the orchestrator, current parameters used by the source virtual input/output server after the source virtual/input output is locked;

responsive to the orchestrator receiving the current parameters from the target virtual input/output server, recreating, by the orchtestrator, a same access for the client to the block storage through the target virtual input/output server located on the second logical partitioned data processing system in the third partition using the current parameters by sending a request to the target virtual input/output server to configure a target virtual adapter in the third partition with the current parameters to provide the client access to the block storage when the client is migrated to a fourth partition in the second logical partitioned data processing system; and responsive to the orchestrator receiving a confirmation that the target virtual adapter is set up, reporting the set up to enable migration of the client to the fourth partition in the second logical partitioned data processing system without terminating execution of the client, wherein the client accesses the block storage through the target virtual adapter of the target virtual input/output server located in the third partition in the same manner as the client accessed the block storage when located in the first partition.

2. The computer implemented method of claim 1, wherein the parameters are sent to the target virtual input/output server located on the second logical partitioned data processing system in an extensible markup language file.

3. A computer program product comprising:

a tangible non-transitory computer usable medium comprising at least one of an electronic, magnetic, and optical medium, having computer usable program code for providing access to block storage, the computer program product comprising:

computer usable program code for monitoring, by an orchestrator executing on a hardware management console, a migration setting for a client executing on a first partition of a plurality of partitions of a first logical partitioned data processing system, wherein the client is at least one of a process and a program, wherein the hardware management console executes on a separate data processing system from the first logical partitioned data processing system, wherein a source virtual input/output server executes on a second partition of the first logical partition data processing system, wherein the source virtual input/output server provides access to the client to a block storage through a server adapter within the second partition, wherein the client accesses the block storage by sending access requests from a client adapter in the first partition to the server adapter in the second partition, wherein the server adapter accesses the block storage and returns results to the client adapter;

computer usable program code, responsive to the orchestrator detecting the client is scheduled for migration to a fourth partition of a second logical partitioned data processing system separate from the first logical partitioned data processing system, for identifying the source virtual input/output server in the first logical partitioned data processing system for the client and requesting parameters used by the source virtual input/output server to provide the client access to the block storage, wherein the parameters comprise a virtual object that describes said server adapter and a block object that describes said block storage;

computer usable program code, responsive to the orchestrator receiving the parameters from the source virtual input/output server, for identifying an unchecked target virtual input/output server executing in a third partition on the second logical partitioned data processing system;

computer usable program code for querying, by the orchestrator, the target virtual input/output server with the parameters to determine whether access to the block storage is available through the target virtual input/output server;

computer usable program code, responsive to the orchestrator receiving an indicator from the target virtual input/output server that access is available, for locking, by the orchestrator, the source virtual input/output server;

computer usable program code for requesting, by the orchestrator, current parameters used by the source virtual input/output server after the source virtual/input output is locked;

computer usable program code, responsive to the orchestrator receiving the current parameters from the target virtual input/output server, for recreating, by the orchtestrator, a same access for the client to the block storage through the target virtual input/output server located on the second logical partitioned data processing system in the third partition using the current parameters by sending a request to the target virtual input/output server to configure a target virtual adapter in the third partition with the current parameters to provide the client access to the block storage when the client is migrated to a fourth partition in the second logical partitioned data processing system; and computer usable program code,responsive to the orchestrator receiving a confirmation that the target virtual adapter is set up, for reporting the set up to enable migration of the client to the fourth partition in the second logical partitioned data processing system without terminating execution of the client, wherein the client accesses the block storage through the target virtual adapter of the target virtual input/output server located in the third partition in the same manner as the client accessed the block storage when located in the first partition.

4. The computer program product of claim 3, wherein the parameters are sent to the target virtual input/output server located on a second logical partitioned data processing system in an extensible markup language file.

5. A data processing system comprising:

a bus;

a communications unit connected to the bus;

a storage device connected to the bus, wherein the storage device includes computer usable program code for an orchestrator; and a processor unit connected to the bus, wherein the processor unit executes the computer usable program to monitoring, by the orchestrator, a migration setting for a client executing on a first partition of a plurality of partitions of a first logical partitioned data processing system, wherein the client is at least one of a process and a program, wherein the hardware management console executes on a separate data processing system from the first logical partitioned data processing system, wherein a source virtual input/output server executes on a second partition of the first logical partition data processing system, wherein the source virtual input/output server provides access to the client to a block storage through a server adapter within the second partition, wherein the client accesses the block storage by sending access requests from a client adapter in the first partition to the server adapter in the second partition, wherein the server adapter accesses the block storage and returns results to the client adapter;

responsive to the orchestrator detecting the client is scheduled for migration to a fourth partition of a second logical partitioned data processing system separate from the first logical partitioned data processing system, identify the source virtual input/output server in the first logical partitioned data processing system for the client and requesting parameters used by the source virtual input/output server to provide the client access to the block storage, wherein the parameters comprise a virtual object that describes said server adapter and a block object that describes said block storage;

responsive to the orchestrator receiving the parameters from the source virtual input/output server, identify an unchecked target virtual input/output server executing in a third partition on the second logical partitioned data processing system;

query, by the orchestrator, the target virtual input/output server with the parameters to determine whether access to the block storage is available through the target virtual input/output server;

responsive to the orchestrator receiving an indicator from the target virtual input/output server that access is available, lock, by the orchestrator, the source virtual input/output server;

request, by the orchestrator, current parameters used by the source virtual input/output server after the source virtual/input output is locked;

responsive to the orchestrator receiving the current parameters from the target virtual input/output server, recreate, by the orchestrator, a same access for the client to the block storage through the target virtual input/output server located on the second logical partitioned data processing system in the third partition using the current parameters by sending a request to the target virtual input/output server to configure a target virtual adapter in the third partition with the current parameters to provide the client access to the block storage when the client is migrated to a fourth partition in the second logical partitioned data processing system; and responsive to the orchestrator receiving a confirmation that the target virtual adapter is set up, report the set up to enable migration of the client to the fourth partition in the second logical partitioned data processing system without terminating execution of the client, wherein the client accesses the block storage through the target virtual adapter of the target virtual input/output server located in the third partition in the same manner as the client accessed the block storage when located in the first partition.

* * * * *